May 12, 1970  C. J. MILLER  3,512,104

OPTICAL MASER ASSEMBLY

Filed March 29, 1965

WITNESSES
Theodore F. Wrobel
James F. Young

INVENTOR
Coleman J. Miller
BY Ernest P. Klipfel
ATTORNEY

United States Patent Office
3,512,104
Patented May 12, 1970

3,512,104
OPTICAL MASER ASSEMBLY
Coleman J. Miller, Severna Park, Md., assignor to Westinghouse Electric Corporation, Pittsburgh, Pa., a corporation of Pennsylvania
Filed Mar. 29, 1965, Ser. No. 443,597
Int. Cl. H01s 3/00
U.S. Cl. 331—94.5
4 Claims

ABSTRACT OF THE DISCLOSURE

Stimulated emission of radiation apparatus including a cluster of active elements with a selective absorber in the region between the elements to provide a small effective diameter of active material at the laser output frequency for the reduction of transverse gain while at the same time providing a large effective diameter at the pump frequency to effectively absorb the pump energy.

---

Figure 1:
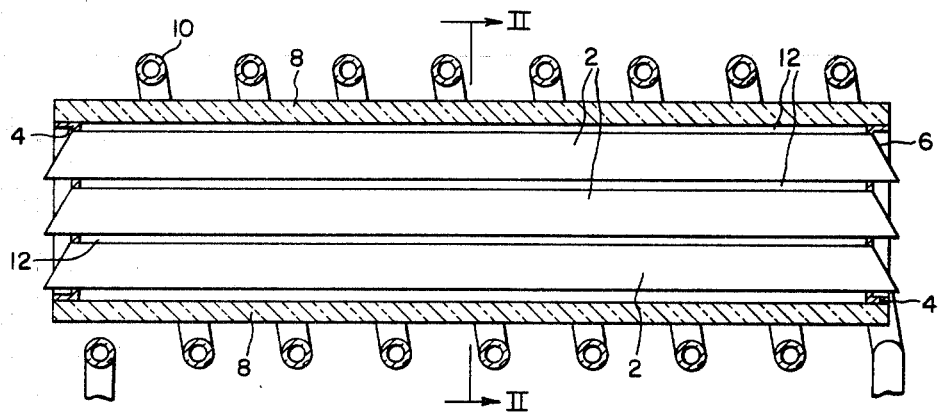

The present invention relates generally to maser assemblies and more particularly relates to a maser assembly for short pulse, or Q-switched, operation that yields high gain and has low loss.

In a maser and more particularly in an optically pumped maser, hereinafter referred to as a laser, intended for short pulse operation, there are two different factors which set the optimum diameter of the active element or laser rod. These factors can limit the gain and increase the losses unless properly balanced. For example, the optical density of a laser rod has an optimum value which determines the maximum amount of energy at the pump frequency which can be absorbed without too large a radial variation in pump excitation. Naturally, it is desirable that maximum pump light absorption of the system be attained but at the same time such pump energy should be absorbed as uniformly as possible throughout the entire rod. Departure from this optimum value quite rapidly reduces the efficiency of the laser.

Another factor is a completely independent limit on the diameter of the laser rod which depends on the characteristics at the laser output frequency. If the transverse gain of the rod at the laser frequency gets appreciable, then the resultant amplification of spontaneous emission reduces the effective upper state lifetime, making it harder to pump, and reducing the efficiency of the system. Hence, the diameter of the rod is limited in order to avoid excessive transverse gain.

When the maximum diameter of the laser rod limited by its transverse gain is greater than the optimum diameter determined by its absorption characteristics, there is no conflict. When the reverse is true, however, as for example in the case of ruby then efficiency and available energy are usually sacrificed in achieving a compromise between the two limiting maximum diameters of any particular active element.

Accordingly, it is an object of the present invention to provide a maser assembly wherein the effective pumping diameter of the laser rod can be optimized without the transverse gain getting prohibitively large.

Another object of the present invention is to provide a maser assembly that yields higher gain and lower losses than heretofore available.

Another object of the present invention is to provide in a maser assembly a small effective diameter of active material at the laser output frequency for the reduction of transverse gain while at the same time providing a large effective diameter at the pump frequency to absorb the pump frequency energy.

Briefly, the present invention accomplishes the above cited objects by providing a cluster assembly of small cross-sectional area active elements. A material which absorbs the laser output frequency, while being transparent at the laser pump frequency, is located in the region between the active elements. If the absorption between active elements at the output frequency is greater than the transverse gain of any of the small individual elements, then the maximum amount of transverse gain never exceeds that of one element. The small effective diameter of the composite rod will reduce the superradiance problem and accordingly allow the effective area of the active material to be pumped to higher population inversions than has been achieved in the past.

Figure 2:
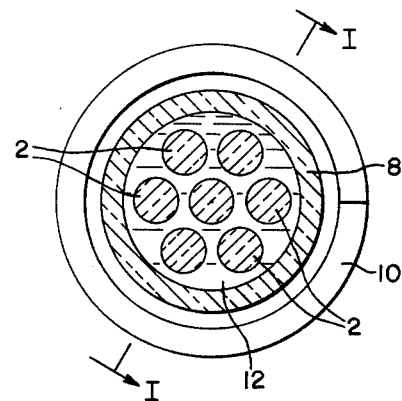

Further objects and advantages of the present invention will be readily apparent from the following detailed description taken in conjunction with the drawing, in which:

FIG. 1 is a vertical longitudinal section of a maser assembly embodying the present invention; and FIG. 2 is a vertical sectional view taken along the line II—II in FIG. 1.

Referring to FIG. 1, a plurality of elongated active elements, such as ruby laser rods, are aligned to extend in a common direction and spaced apart from each other in the transverse direction by means of end plates 4. The end plates 4 are disposed inwardly from the ends of each active element 2 to allow the output frequency energy to exit the assembly. The active elements 2 are provided with Brewster angle ends 6 for efficient transfer of the laser output across the interface or end surface area of the elements 2. A transparent housing 8 abuts the end plates 4 to form a chamber containing the cluster of active elements 2. A pump 10, such as a helical light source, provides energy at a pump frequency to said active elements 2.

The desirability of the effective diameter of the active element at the laser output frequency being less than the effective diameter at the pump frequency, thereby limiting the transverse gain of the system, has been noted. In accordance with the present invention the space between the active elements 2 is filled with a material which absorbs the laser output frequency while being transparent at the laser pump frequency. As a result, the transverse gain is reduced with a corresponding decrease in lateral superradiance. The maximum diameter of a single active element determines the transverse gain of the entire assembly. By providing a material between the rods that absorbs the output frequency at a greater rate than the transverse gain of the individual active elements, the maximum amount of transverse gain of the apparatus will never exceed that of one element. The maximum diameter of the individual elements need be determined only by the transverse gain considerations of each element. At the pump frequency, however, all of the elements are coupled to the same pump source 10, and the effective diameter for a maximum transfer of energy at the pump frequency into the system is determined by the geometrical configuration of the diameters of the rods disposed along an imaginary diameter line drawn through the cluster of elements. By using a substantially large number of rods in the cluster, the effective diameter can always be made optimum for best pumping transfer of energy without the transverse gain of the output frequency signal getting too high. When the bundle or composite rod is used with external optics, not illustrated, the resultant cavity can be readily designed in accordance with well known principles to assure that the individual elements 2 all contribute usefully to the output energy. In such a manner both output energy and efficiency will be maximized.

One such frequency sensitive material 12 may advantageously be a clodding solution of copper sulfate and glycerine. Such a solution can be readily poured into the chamber formed by the end plates 4 and the sleeve 8. The transverse separation of the active elements 2 should be minimumly separated in the order of 1/16 of an inch. The copper sulfate is advantageously dissolved in the glycerine in the ratio of one part of 15 in the glycerine. The copper ions absorb the laser output frequency without absorbing the pump frequency energy input. In any event, the refractive index of the absorption material should match as nearly as possible the refractive index of the active elements 2 which may be utilized. For example, it has been found that the glycerine solution having a refractive index of 1.47 is satisfactory for operation with a ruby laser rod which has a refractive index of 1.76. The common form of cupric sulfate is a hydrate, $CuSO_4 \cdot 5H_2O$ which readily goes into solution. This means that the actual fractions, by weight, are approximately two parts $CuSO_4$, one part $H_2O$ and forty-five parts glycerine ($CH_2OHCHOHCH_2OH$). By volume, appreciably less than one part in fifteen of the cupric sulfate hydrate is used, approximately one part in twenty-three, which is less than 5%.

It is to be understood, however, that any suitable cladding material may be utilized such as a plastic solution or a coating placed on each individual active element 2. Of course, the material is to be chosen so as not to explode or boil as a result of opeartion of the laser apparatus.

The primary purpose of the cladding is to reduce losses due to amplification of transverse radiation. This is accomplished in two ways by the cladding, first the glycerine provides a better match to the active elements 2 when ruby is utilized than does air. As a result, reflection of the transverse radiation at the surface of the active element is cut from approximately 70% to approximately 30%. Since less energy is reflected back through the active element, less energy is lost by amplification of this energy. The second benefit is provided by the attenuation of the ruby R-line radiation by the copper sulfate,$CuSO_4$. Any R-line radiation which is reflected back into the active elements by the surfaces of the sleeve 8 or any other surface in the lamp cavity (not shown) is attenuated and thus does not remove a substantial amount of energy due to amplification. The sleeve 8 may advantageously be a glass material sold under the trademark Pyrex. Additional benefit is accrued from the fact that the Pyrex glass of the sleeve 8 absorbs all ultraviolet frequency signals beyond about 3,000 angstroms and so depopulation due to ultraviolet pumping is minimized. The copper sulfate removes most infrared energy beyond about 6,000 angstroms and reduces the heating effects on the active elements 2. In addition the cladding effectively increases the diameter of the active elements and therefore a larger portion of the pump light is intercepted. The copper sulfate-glycerine solution passes better than 90% of the energy across the pump band. It has been successfully operated and proven that no damage is caused to the solution by the pump light energy.

Hence, it is readily apparent that the present invention provides a highly pumped laser gain condition which is only achieved by limiting the transverse gain in the active material. A high power output is efficiently obtained from the maser assembly for a short pulse output operation. The combination of the cluster of smaller diameter laser rods and the frequency sensitive material interdisposed between said rods reduces the transverse gain with a corresponding decrease in lateral superradiance while at the same time increasing the effective diameter of the total active material being pumped to thereby more evenly distribute the pump energy within the active material.

While the present invention has been described with a degree of particularity for the purposes of illustration, it is to be understood that all modifications, altertaions and substitutions within the spirit and scope of the present invetnion are herein meant to be included.

I claim as my invention:

1. In a maser assembly the combination comprising; a plurality of elongated active elements; an end plate positioned inwardly from each end of said active elements aligning said elements in a common direction and spacing them from each other in a transverse direction; transparent housing means connected to said end plates for forming a chamber with said end plates; means external to said housing means for pumping said active elements with energy of a pump frequency; and a cladding solution within said chamber and between said elements for absorbing energy at the output frequency to reduce losses due to amplification of transverse radiation but allowing passage of energy at said pump frequency.

2. The apparatus of claim 1 wherein said solution is copper sulfate and glycerine.

3. The apparatus of claim 1 wherein said solution includes copper sulfate and glycerine in the ratio of one part copper sulfate to fifteen parts glycerine.

4. In combination; a plurality of elongated active elements each having a peripheral area and opposite end surface areas; end plates for mounting said active elements to extend in a common direction and spaced apart from each other in the transverse direction; closure means abutting each end plate for forming a chamber around said plurality of active elements excluding the end surface areas of said elements; and means within said chamber located within the space between said elements as well as said closure means for allowing passage of energy at a pump frequency and absorbing energy at an output signal frequency; and means for pumping said active elements with energy at a pump frequency; said active elements emitting energy at an output signal frequency; said active elements emitting energy at an output signal frequency through their end surface areas.

References Cited

UNITED STATES PATENTS

| | | | |
|---|---|---|---|
| 1,657,776 | 1/1928 | Wolfe et al. | 350—312 |
| 2,535,770 | 12/1950 | Wilde | 350—312 |
| 2,537,011 | 1/1951 | Aparicio | 350—312 |
| 3,356,966 | 12/1967 | Miller | 331—94.5 |

RONALD L. WIBERT, Primary Examiner

U.S. Cl. X.R.

30—4.3